Figure 1:
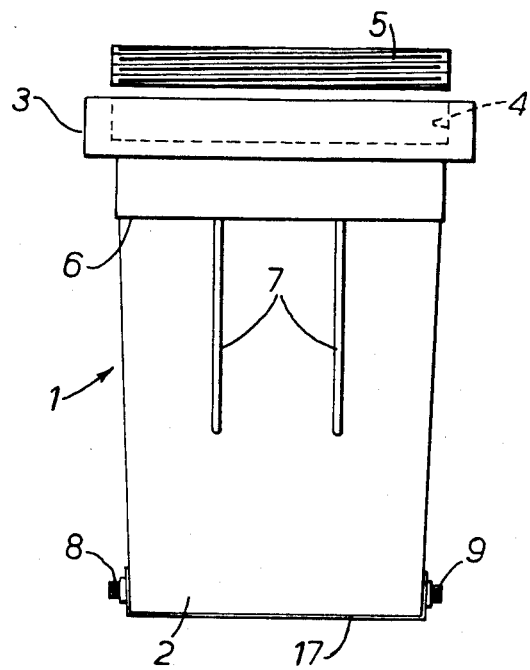

United States Patent [19]

Hudson

[11] Patent Number: 4,665,941

[45] Date of Patent: * May 19, 1987

[54] FLUID CONTROL OF METERING ASSEMBLIES

[76] Inventor: David R. Hudson, 16, Woodland Place, Penarth, Glamorgan, United Kingdom

[*] Notice: The portion of the term of this patent subsequent to Aug. 19, 2003 has been disclaimed.

[21] Appl. No.: 362,420

[22] Filed: Mar. 26, 1982

[30] Foreign Application Priority Data

Mar. 27, 1981 [GB] United Kingdom ............... 8109620
Apr. 11, 1981 [GB] United Kingdom ............... 8111450
Aug. 22, 1981 [GB] United Kingdom ............... 8125720

[51] Int. Cl.⁴ ......................................... F16K 11/00
[52] U.S. Cl. .................................. 137/364; 137/269; 137/371; 137/614.2
[58] Field of Search ............... 137/269, 271, 363, 364, 137/614.2, 371, 360

[56] References Cited

U.S. PATENT DOCUMENTS 1,249,435 12/1917 Lofton ................................ 137/364
2,529,254 11/1950 Ives ..................................... 137/269
3,834,417 9/1974 Holben ............................... 137/269
4,029,121 6/1977 Buzzi ................................ 137/614.2
4,076,040 2/1978 Alpers et al. ........................ 137/371
4,257,446 3/1981 Ray ..................................... 137/371

Primary Examiner—A. Michael Chambers
Attorney, Agent, or Firm—Trexler, Bushnell, Giangiorgi & Blackstone, Ltd.

[57] ABSTRACT

A surface box for a stop cock (25-29) and water meter (40) has a housing (1) of moulded plastics with ports (10, 11) in the base for the external connection of pipes. Another moulded plastics body (20) is screwed down to the base, inside the housing, and forms part of a passage from port to port. A stop cock (25-29) is carried by this body and can be operated through the top of the housing to close over the mouth of a duct formed within the base from the inlet port. Downstream of the stop cock, a screw cap (39) forming a wall of the passage can be removed and replaced by a water meter (40) which co-operates with the body in such a way that water has to flow through it. Further downstream, a non-return valve (37) or a further stop cock is carried by the body. There are no pipe connections made inside the housing, and the stop cock(s) and screw elements are operable within narrow confines, allowing a very compact box.

7 Claims, 8 Drawing Figures

FLUID CONTROL OF METERING ASSEMBLIES

This invention relates to fluid control or metering assemblies. It is primarily intended for the installation of water meters and/or stopcocks in the main supply to a building.

Normally the water is brought to a building underground and there is an external stopcock to which access is by means of a box whose lid is flush with the ground surface. The cock is at the bottom of this and also, occasionally, a water meter. It is likely that such meters will be of increasing use.

Generally such surface boxes are of heavy concrete construction. A large hole has to be dug and a base platform set at the bottom of it. The plumbing is brought over this base and the stopcock and meter, if provided, are fitted. The side walls are then built up around the inlet and outlet pipes, and completed usually by prefabricated rectangular frame members in concrete. The lid is normally of cast iron and split, for ease of opening.

It is difficult to make such a structure waterproof. It is time-consuming to build, it has to be large to provide decent access to the fittings and to allow them to be undone for replacement or repair (a powerful spanner has to have freedom to move) and the transport and handling of the massive concrete blocks is added expense and trouble.

It is the aim of this invention to provide a surface box which is easy to install and maintain, compact and light, and generally without most of the drawbacks outlined above.

According to the present invention there is provided a fluid control or metering assembly comprising a top-lidded housing for burying upright in the ground with access through the top, inlet and outlet ports adapted to receive plumbing fittings for the external attachment of pipes, and a mounting for a fluid control or metering device, the mounting being such that when said device is fitted, a closed passage is formed via said device between said inlet and outlet ports.

Although reference is made throughout this specification to a surface box for burying in the ground, it should be understood that it also applies to a box that can be recessed into a wall. Such a box will generally be shallower and simply turned on its side as compared with the surface box.

Normally, the fluid control device will be a stop cock carried by the mounting and operable through the top of the housing. Preferably, the cock closure will be over a port in the base of the housing forming part of the passage. The passage may be adapted for metered or unmetered flow, the passage having a removable section which when in place completes an unmetered portion of the passage downstream of the stop cock, and which is replaceable by a meter whose engagement with the mounting ensures that flow is through said meter. The removable section may simply be a screw cap.

Conveniently, a non-release valve is provided in the passage downstream of the removable section. Thus with the stop cock closed, the change from metered to unmetered flow can be made with no escape of water. There could instead be another stop cock, similar to the upstream one.

The housing is preferably a unitary plastics moulding, and the mounting may have a main body which is a plastics moulding securable to the base of the housing by fastener means operable through the top of the housing. These fasteners will conveniently be screws or bolts which can be tightened or loosened by a tool extending lengthwise into the housing, such as a screwdriver or box spanner. The housing can therefore be of very much smaller span than the conventional surface box. The fitting of the pipes to the outside of the box is done on installation and generally they do not need to be touched thereafter.

Figure 2:
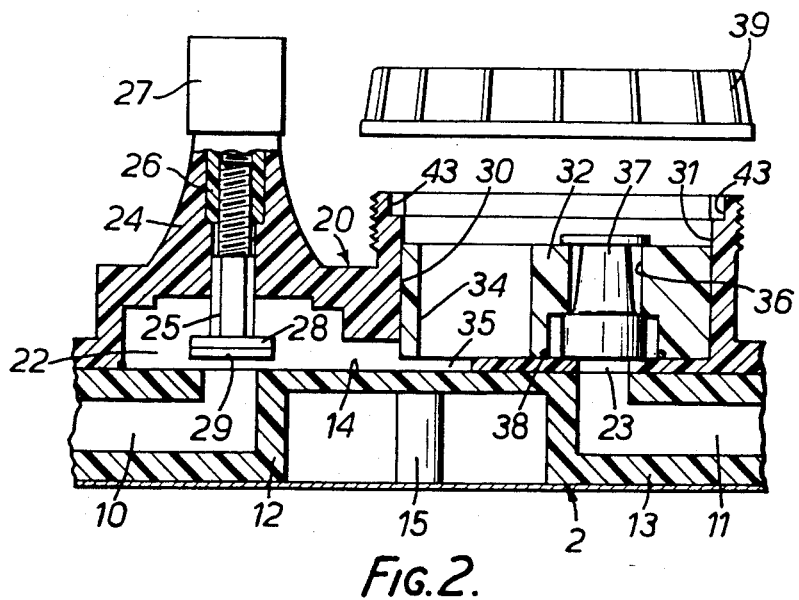
Figure 3:
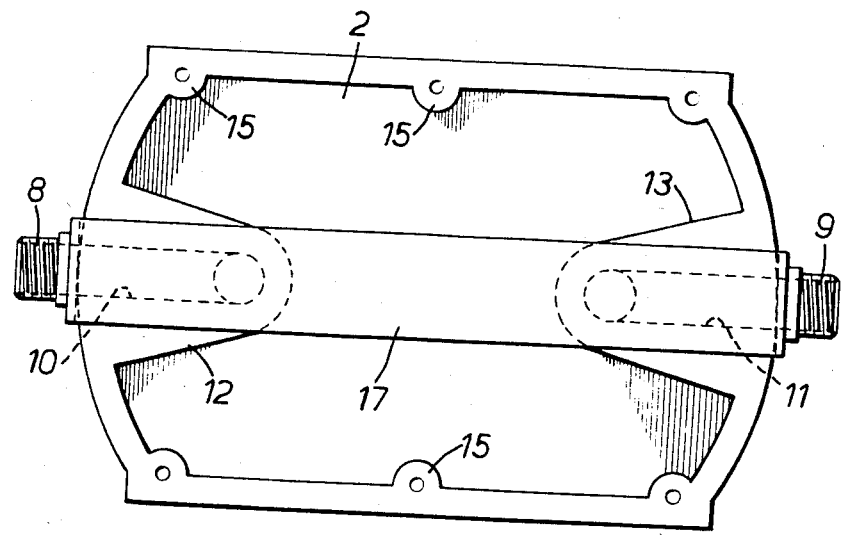
Figure 4:
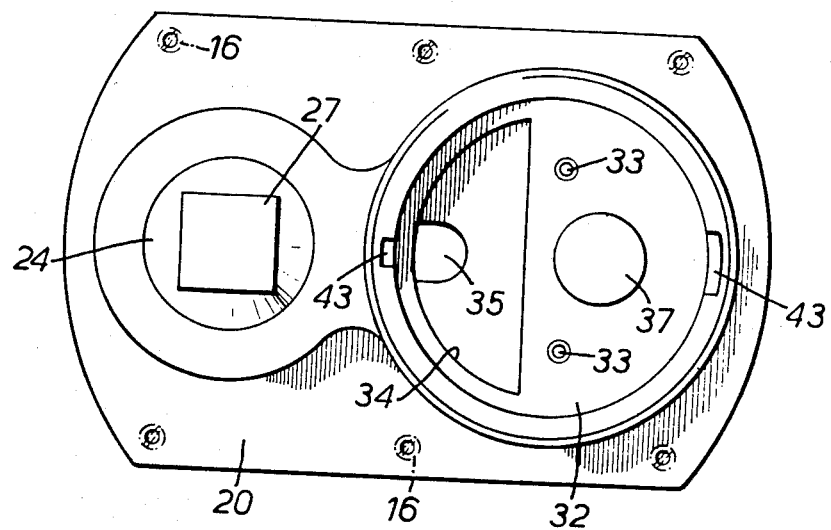
Figure 5:
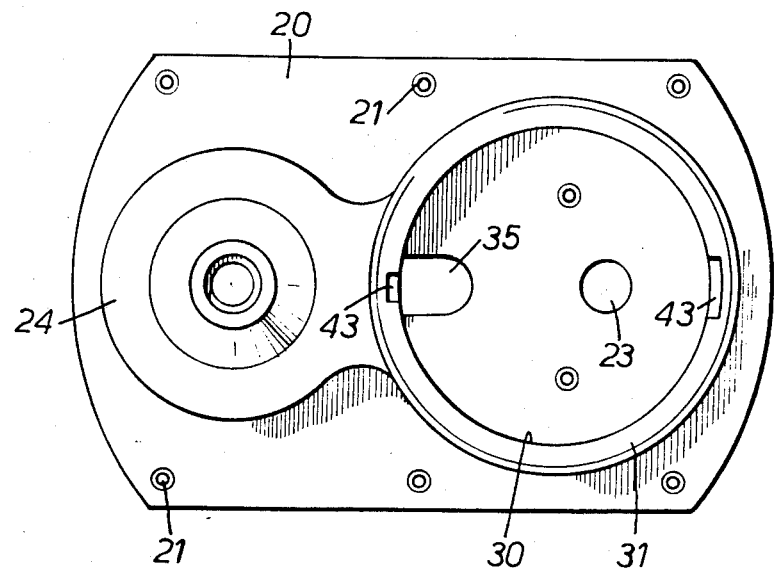
Figure 6:
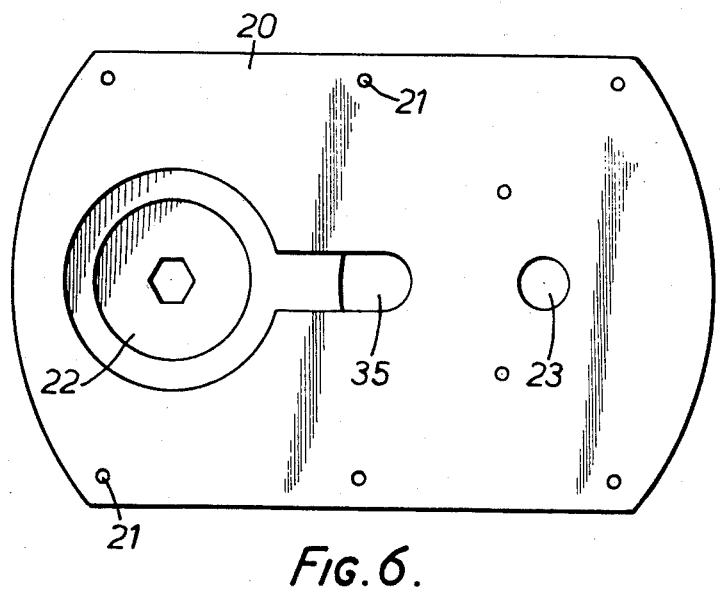
Figure 7:
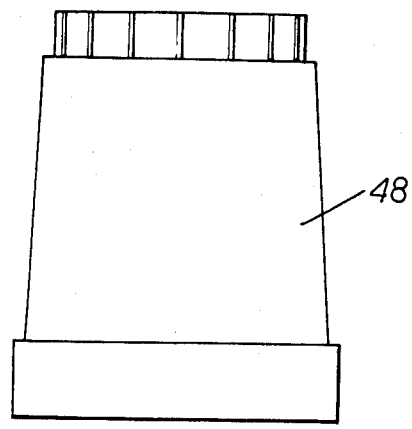
Figure 7:
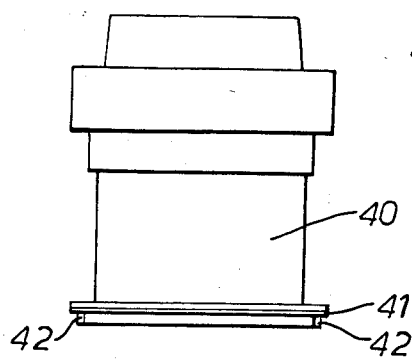
Figure 8:
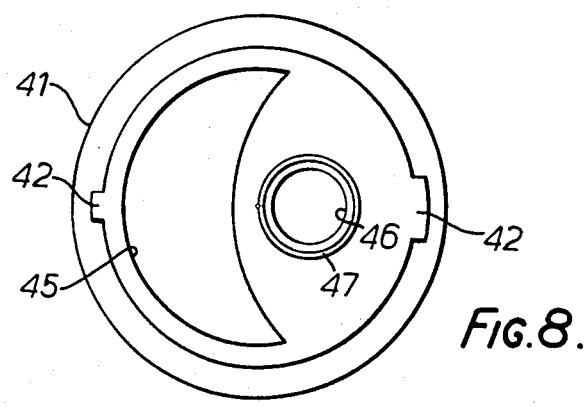

For a better understanding of the invention one constructional form will now be described, by way of example, with reference to the accompanying drawings, in which:

FIG. 1 is a side elevation of a surface box for a stop cock and water meter,

FIG. 2 is a vertical section, to an enlarged scale, of the lower portion of the box, FIG. 3 is an underneath plan view of the box, FIG. 4 is a top plan view of a stop cock assembly housed in the base of the box, FIG. 5 is a top plan view of the main body of the assembly, FIG. 6 is an underneath plan view of the body of FIG. 5, FIG. 7 is an exploded side elevation of a water meter housing and cap in vertical alignment for fitting to the stop cock assembly, and FIG. 8 is an underneath plan view of the meter housing.

The box comprises a main housing 1 which is of generally rectangular form with rounded corners in plan and tapering slightly outwardly from its base 2. It is moulded in hard plastics material. At the top it is stepped outwardly to provide a rim 3 with a circular screw-threaded opening 4 to receive a cover plate 5. When installed, the top of this will be flush with the surface of the ground. Although a seal could be provided for this cover, it need not be made watertight and any water that does penetrate may escape via holes in the shoulder 6 where the rim 3 steps inwardly to meet the main portion of the box. Reinforcing ribs 7 are provided to strengthen the rim 3. These are optional At the opposite ends of the base 2 there are fittings 8 and 9 for the external connection of water pipes. These communicate with ducts 10 and 11 which extend towards each other within generally triangular-shaped blocks 12 and 13 integral with the box moulding, and then turn upwards to open at the flat upper interior surface 14 of the base 2. Along the two longer edges in the recessed underside of the base there are bosses 15 with threaded holes to receive screws 16 which secure the stopcock assembly. There is also an earthing strip 17 of shallow U-form under the box, interconnecting the two fittings 8 and 9. Thus far the arrangement is symmetrical.

The valve and meter housing has a main body 20, also moulded in hard plastics material, which in plan view (see FIGS. 5 and 6) is generally rectangular with rounded ends to fit closely into the bottom of the box. It has holes 21 along its straight sides which will register with the bosses 15. Its underside has a flat peripheral and central land area which seals against the surface 14, so that the duct 10 opens centrally into a cylindrical chamber 22 and the duct 11 opens centrally into a circular port 23. These may be surrounded by O-ring seals at the interface.

The body 20 has a hollow upstanding spigot 24 integrally moulded with it in alignment with the centre of the chamber 22. A valve stem 25 of octagonal cross-section can move vertically with a close sliding fit in the base of this spigot, its upper end being screw-threaded to be engaged by the internal threading of a cylindrical sleeve 26 rotatable by a knob 27. The base of the valve stem has a head 28 with a washer 29 that will seal over the mouth of the duct 10. The washer will be rubber or soft plastics, while the other parts of this stopcock or valve can be hard moulded plastics.

Thus the valve body is provided by the base 2 of the box and the body 20, and there are very simple moving parts which can be adjusted by turning the knob 27 by hand or an instrument inserted when the cover 5 is removed.

The other end of the body 20 has a cylindrical recess 30 in its upper side with a raised rim 31, externally screw-threaded. A cylindrical insert 32 fits closely within the recess 30, and is secured by screws 33. It has a semi-cylindrical opening 34 on the side nearest the stopcock, and a port 35 in the body 20 provides communication between the chamber 22 and this opening 34. On the other side a stepped cylindrical passage 36 is open at its lower end to the port 23. This passage houses a non-return valve 37, oriented to allow flow downwards into the duct 11. A sealing ring 38 is provided around the lower end of the passage 36 to cooperate with the body 20, and ensure that no water can seep directly from the opening 34 into the port 23.

In one mode of operation, without a water meter, a cap 39 with a sealing ring is screwed over the rim 31 and completes a closed passage between the ducts 10 and 11, assuming the stopcock is open. The water flow is from the duct 10 into the chamber 20, through the port 35, up through the opening 34 and into the space immediately below the cap 39, down the passage 36 via the non-return valve 37, through the port 23 and into the duct 11.

When a water meter is to be fitted, the stopcock is closed down, and the cap 39 removed. Water cannot flow back from the duct 11 because of the nonreturn valve 37. The circular base of a water meter housing 40 can be seated within the rim 31, and it has an O-ring seal 41 to engage the top of the rim and different sized lugs 42 at opposite sides to fit corresponding recesses 43 and so ensure correct orientation.

As seen in FIG. 8, the underside of the meter housing has a crescent-shaped inlet 45, which mostly overlies the opening 34, and a circular outlet 46, surrounded by an O-ring seal 47, which registers with the passage 36. The seal 47 co-operates with the upper face of the insert 32. The top end face (not shown) of the housing 40 has the meter display. A frusto-conical cap 48 fits over the housing 40 and can be screwed on to the rim 31 to secure the housing in place. The top of the cap leaves the meter display exposed, while internally it engages the housing 40 and urges it down to compress the seals 41 and 47.

The path for the water from the opening 34 is now up into the meter housing through inlet 45, and then down through outlet 46 past the non-return valve 37. The passage of water is thus recorded.

For installation of this box a fairly small hole has to be dug but with room either side to provide external access to the fittings at the inlet and outlet ports. Once the pipes have been fitted to these it is unlikely that they will have to receive any attention. Although the box is of small plan area, the meter is readily accessible and can be read through the top of the cap 48.

I claim:

1. A fluid control or metering assembly comprising a housing for burying upright in the ground and having a lower end and a top, inlet and outlet ports at the lower end of the housing to which external pipes can be plumbed, means defining a chamber within said housing adjacent said lower end having discrete passages thereinto respectively connected to said inlet and outlet ports, said chamber being open at the upper end, a mounting means for a fluid control means at said open end, the mounting means being securable with the fluid control means to form a closed passage between said discrete passages and hence the inlet and outlet ports, a cover securable to said mounting means as an alternative to said fluid control means and providing a non-fluid controlled straight-through flow path between said passages and hence said ports, and a removable lid distinct from said mounting which fits into the top of the housing and which, when removed, gives access to said fluid control means and said mounting within the housing, said closed passage remaining unaffected by such removal.

2. A fluid control or metering assembly according to claim 1, wherein the mounting carries a stop cock operable through the top of the housing, the cock closure being over a port of the housing between the inlet port and the respective passage.

3. A fluid control or metering assembly according to claim 1 or claim 2, wherein the housing is a unitary plastics moulding.

4. A fluid control or metering assembly according to claim 1 or claim 2, wherein the mounting has a main body which is a plastics moulding securable to the base of the housing by fastener means operable through the top of the housing.

5. A fluid control or metering assembly according to claim 1 or claim 2, wherein the inlet and outlet ports are at opposite ends and lead into respective L-shaped passages which open to the upper interior surface of the base of the housing.

6. A fluid control or metering assembly according to claim 1, wherein the cover is a screw cap.

7. A fluid control or metering assembly according to claim 1 or claim 4 wherein a non-return valve is provided in the passage downstream of the chamber.

* * * * *